ÚSOO5119459A

United States Patent [19]

Meyerhoefer et al.

[11] Patent Number: 5,119,459
[45] Date of Patent: Jun. 2, 1992

[54] OPTICAL FIBER STORAGE AND DISTRIBUTION CABINET

[75] Inventors: Carl Meyerhoefer, Dix Hills; Christopher V. Kayser, Bay Shore, both of N.Y.

[73] Assignee: Porta Systems Corp., Syosset, N.Y.

[21] Appl. No.: 655,839

[22] Filed: Feb. 15, 1991

[51] Int. Cl.⁵ .......................................... G02B 6/32
[52] U.S. Cl. ..................................... 385/135; 385/95
[58] Field of Search ................ 350/96.20; 385/95, 96, 385/97, 98, 99, 134, 135

[56] References Cited

U.S. PATENT DOCUMENTS

| | | | |
|---|---|---|---|
| 4,359,262 | 11/1982 | Dolan | 350/96.20 |
| 4,627,686 | 12/1986 | Szentesi | 350/96.20 |
| 4,722,585 | 2/1988 | Boyer | 350/96.20 |
| 4,765,708 | 8/1988 | Becker et al. | 350/96.20 |
| 4,792,203 | 12/1988 | Nelson et al. | 350/96.20 |
| 4,805,979 | 2/1989 | Bossard et al. | 350/96.20 |
| 5,013,121 | 5/1991 | Anton et al. | 350/96.20 |

FOREIGN PATENT DOCUMENTS 3248003 6/1984 Fed. Rep. of Germany ... 350/96.20

OTHER PUBLICATIONS

Product Sheet, "Northern Telecom QMY Interface" Issue #14061 Northern Telecom, Morton Grove, Ill.
Product Sheet, "Customer Premise Unit", Jan. 1989, Bejed, Inc., Portland, Ore.
Product Sheet, "Customer Premise Unit", Catalog Data Sheet #0887-206-1 Dorran Photonics Inc./3M, Atlantic Highlands, N.J.
Product Sheet, "PDP-24 Premise Distribution Panel" FOCS, Fibre Optic Communications, Woroesterm, Me.
Product Sheet, "Cable Management Systems" Aster Corporation, Milford, Mass.
"Optical Termination Cabinet", Fiber Tech, Shrewsbury, Mass.
"Mini Fiber In-Building Panel", Catalog #FIPM-06, pp. 5-10 ADC Telecommunications, Minn.
"Lightguide Premises Distribution System Interconnection/Cross-Connection Apparatus", AT&T #636-299-106, Issue 2, Dec. 1986.
"Fiber Optic Products for Premises Communications", Catalog #CC-45 Siecor Corp., Hickory, N.C.
"Wall-Mountable Distribution Center", Catalogue #CPC-3 (2 pages) Siecor Corp., Hickory, N.C.
Product Sheets (11) "Reliable Electric/Utility Products", 1990 Reliance Comm/Tec, Franklin Park, Ill.
Product Sheets (4), "Reliable Electric/Utility Products", 1989 Reliance Comm/Tec, Franklin Park, Ill.
Product Sheets (13), "FOST Series", Reliable Electric/Utility Products, 1990, Reliance Comm/Tec, Franklin Park, Ill.
"General Information Practice for Fiber Optic Splice Holders", bj-21521-000-100, Issue 3, May 1990, Bejed, Inc., Portland, Oreg.
"User Manual Fiber Distribution Panel-Lan/12", TPP 15-1200-OD16/15-1600-OD16, Jul. 1987, Telect Fiber Optics, Inc., Spokane, Wash.
Product Sheets (6), "Local Area Network Fiber Optic Panels", Aug. 1989 Telect Fiber Optics, Inc., Spokane, Wash.
Product Sheets 6-47 and 6-48, "Lightguide—A Total Linkage & Transport" Catalog #2492C, Issue #2, Nov. 1988, AT&T, Berkley Heights, N.J.
Product Sheet, "Northern Telecon Optical Fiber Splice Organizer" Northern Telecon, Nashville, Tenn.
Product Sheets (3) "Fiber Optic Signal Cross Connect Systems", 1988 ADC Telecommunications, Minneapolis, Minn.
"AT&T LIV Installation Instructions", Dec. 15, 1985, pp. 1-10 AT&T, Berkley Heights, N.J.
"Lightguide—A Total Linkage & Transport System", Nov. 1988, Issue #2, pp. 6-46-6-53, AT&T, Berkley Heights, N.J.
"AT&T LIV Installation Instructions", Dec. 15, 1985, pp. 1-10 AT&T, Berkley Heights, N.J.

Primary Examiner—Frank Gonzalez
Assistant Examiner—Phan T. Heartney
Attorney, Agent, or Firm—Fitzpatrick, Cella, Harper & Scinto

[57] ABSTRACT

An optical fiber storage and distribution cabinet of molded plastic box-like construction with U-shaped formations open through the bottom wall of the cabinet to provide an easily molded door hinge and spool-like fiber storage elements which also serve to mount a removable splice tray. The splice tray has cable and fiber guide formations and splice holding means which allow fiber entry and exit from different directions.

31 Claims, 7 Drawing Sheets

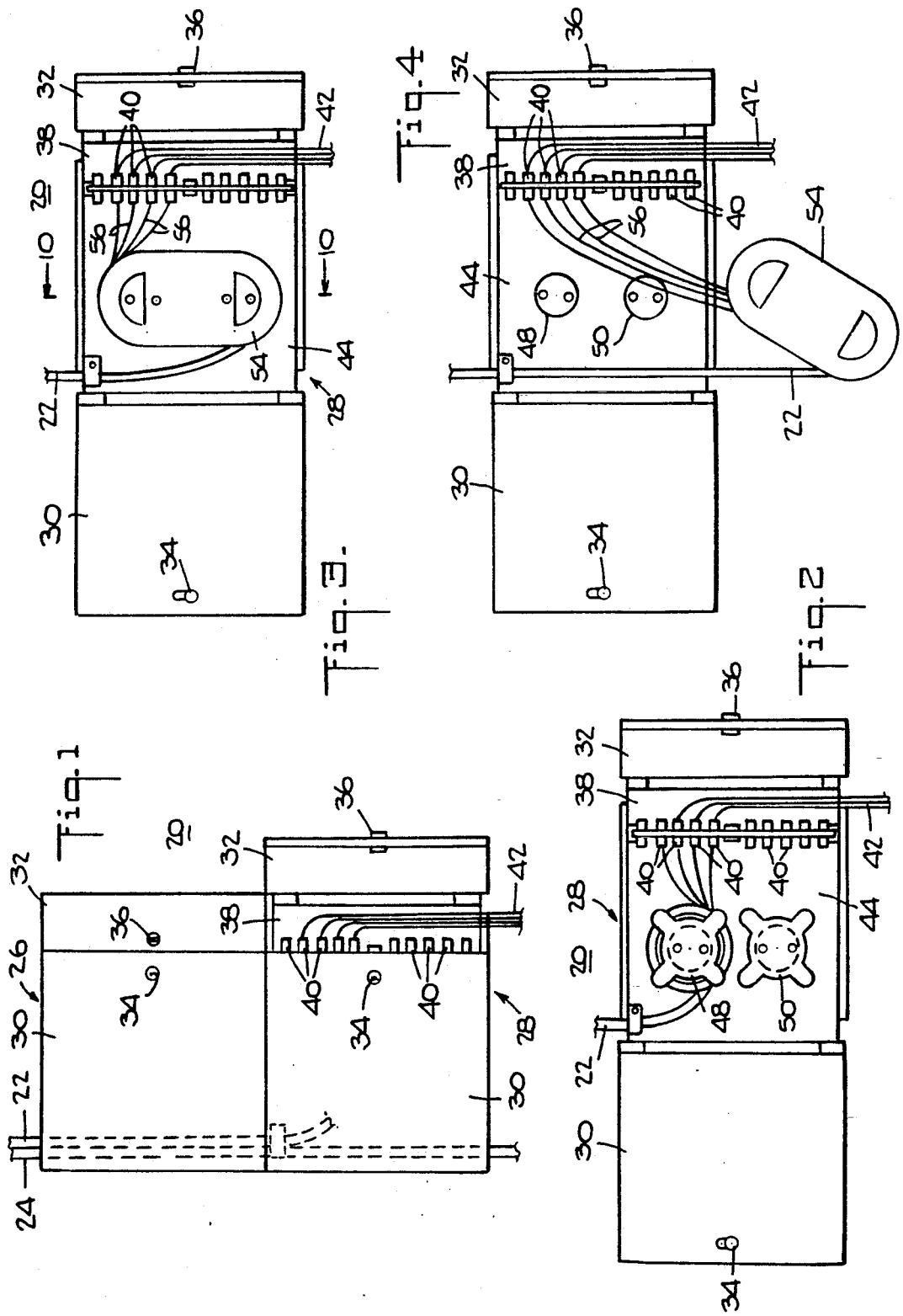

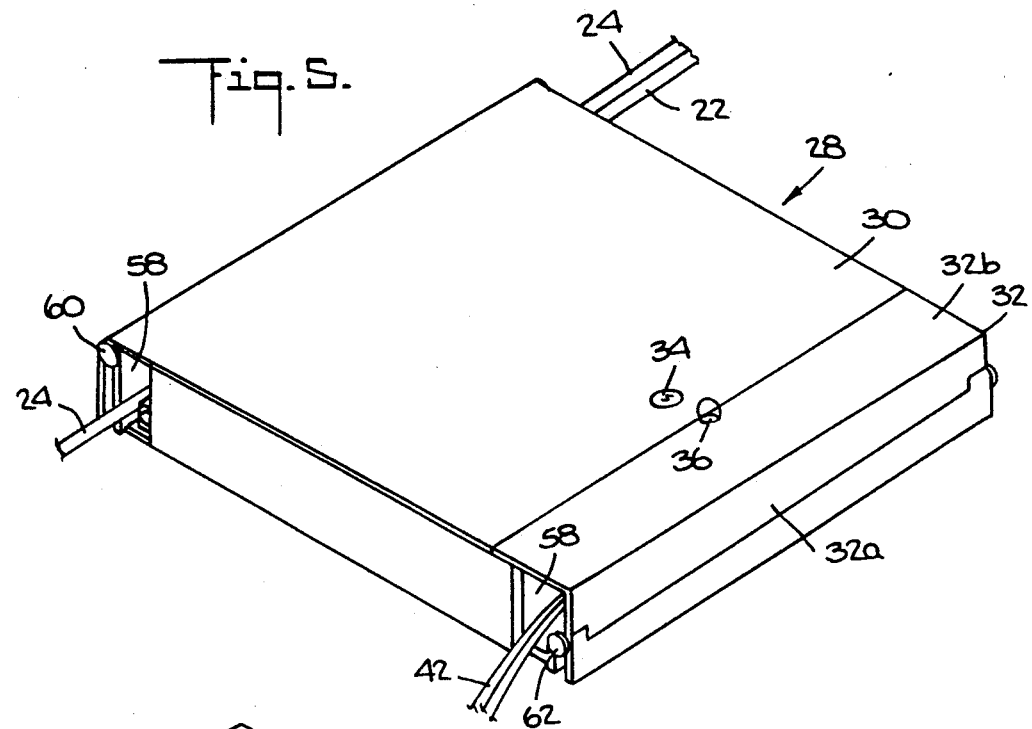
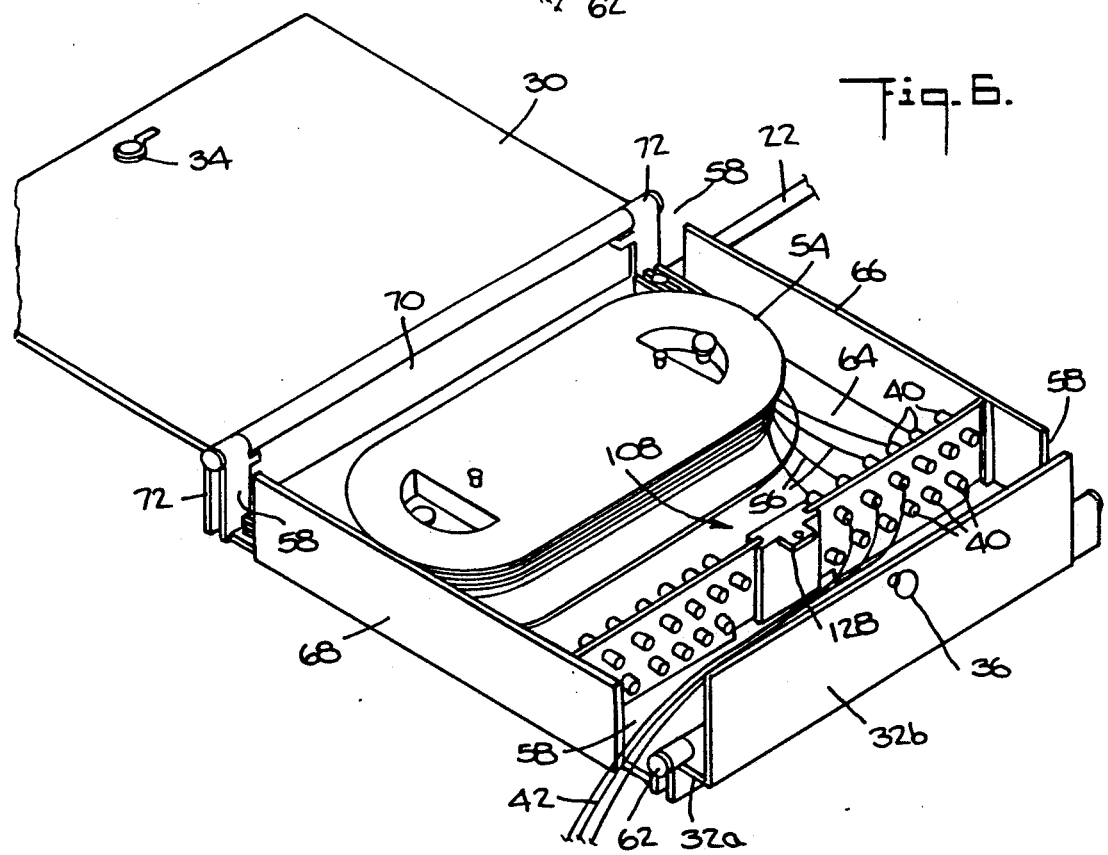

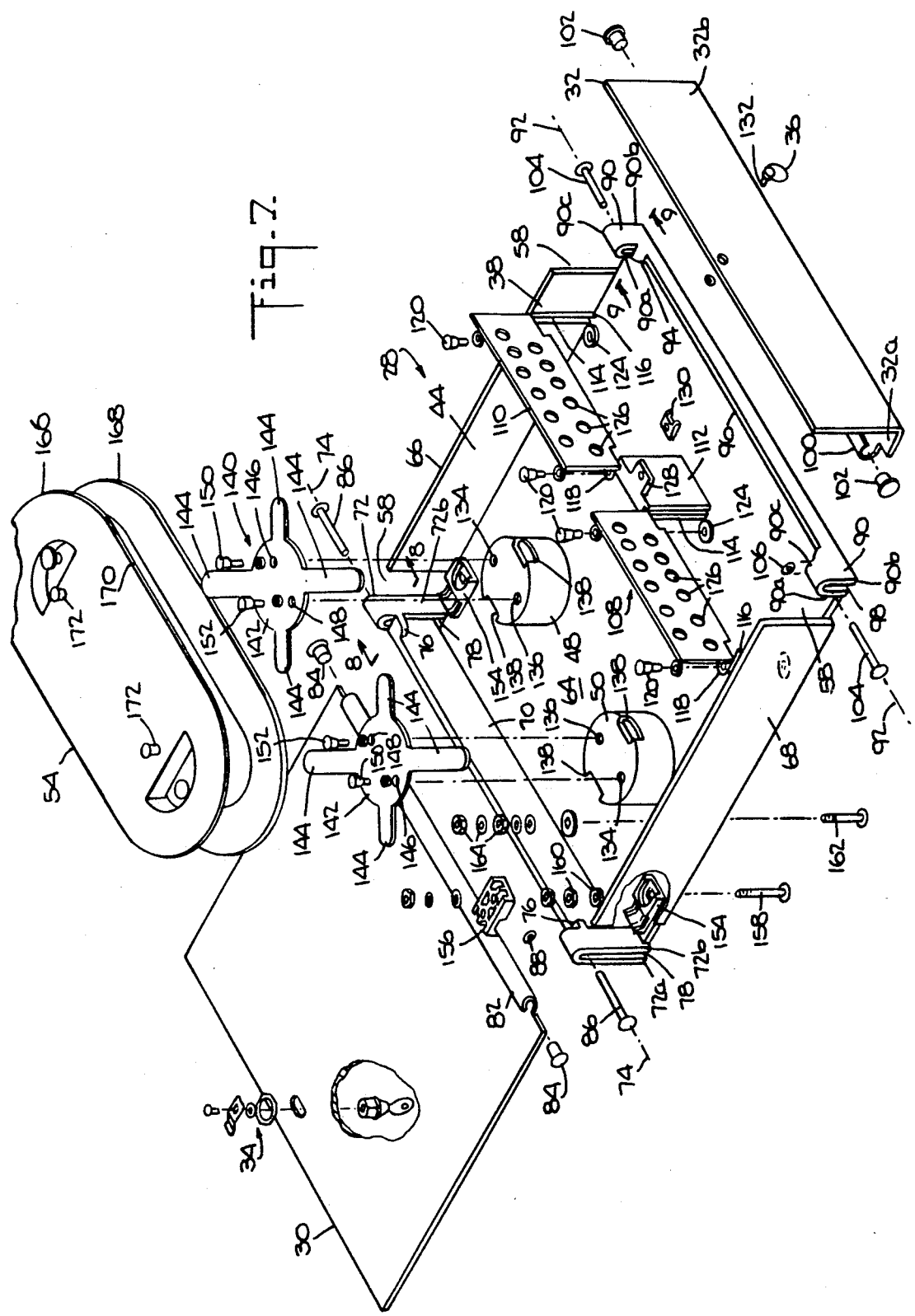

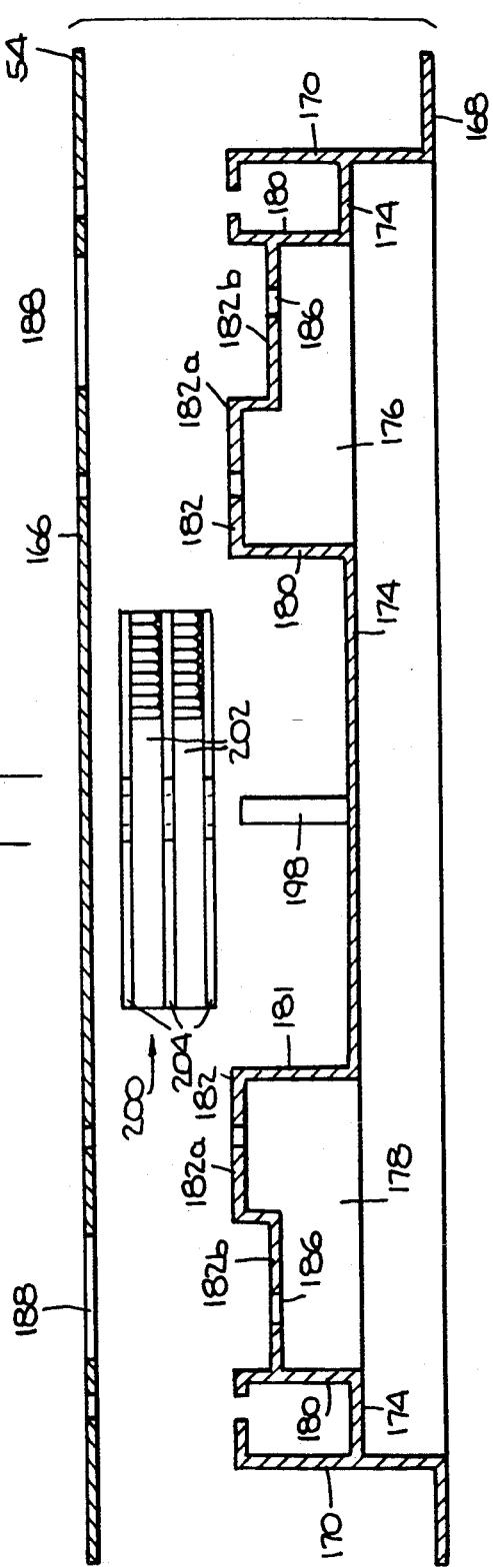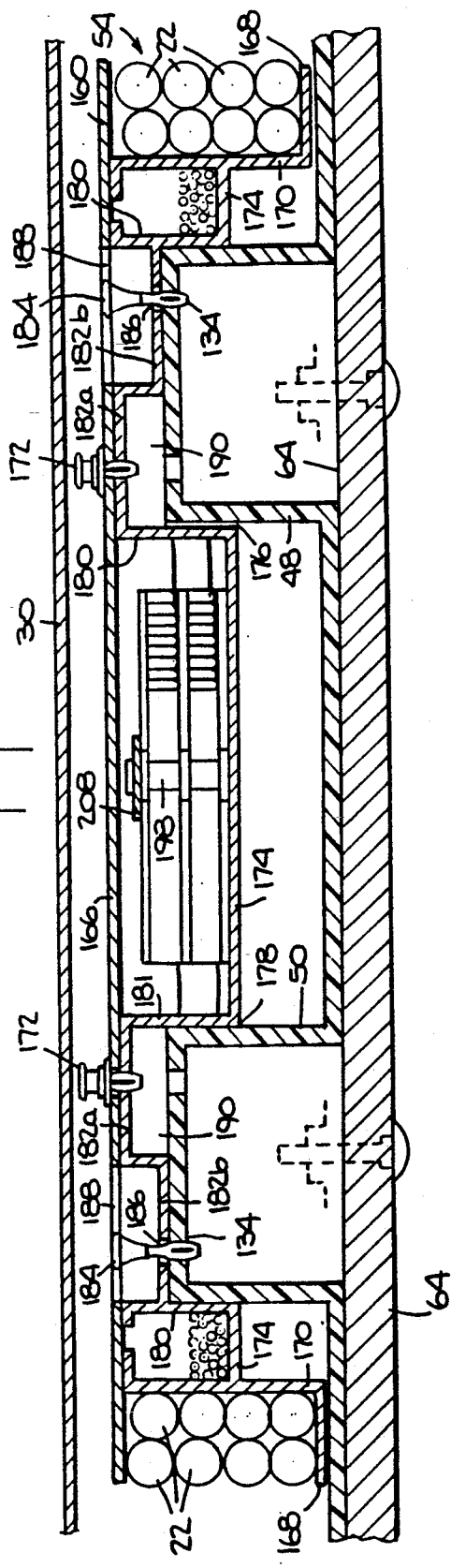

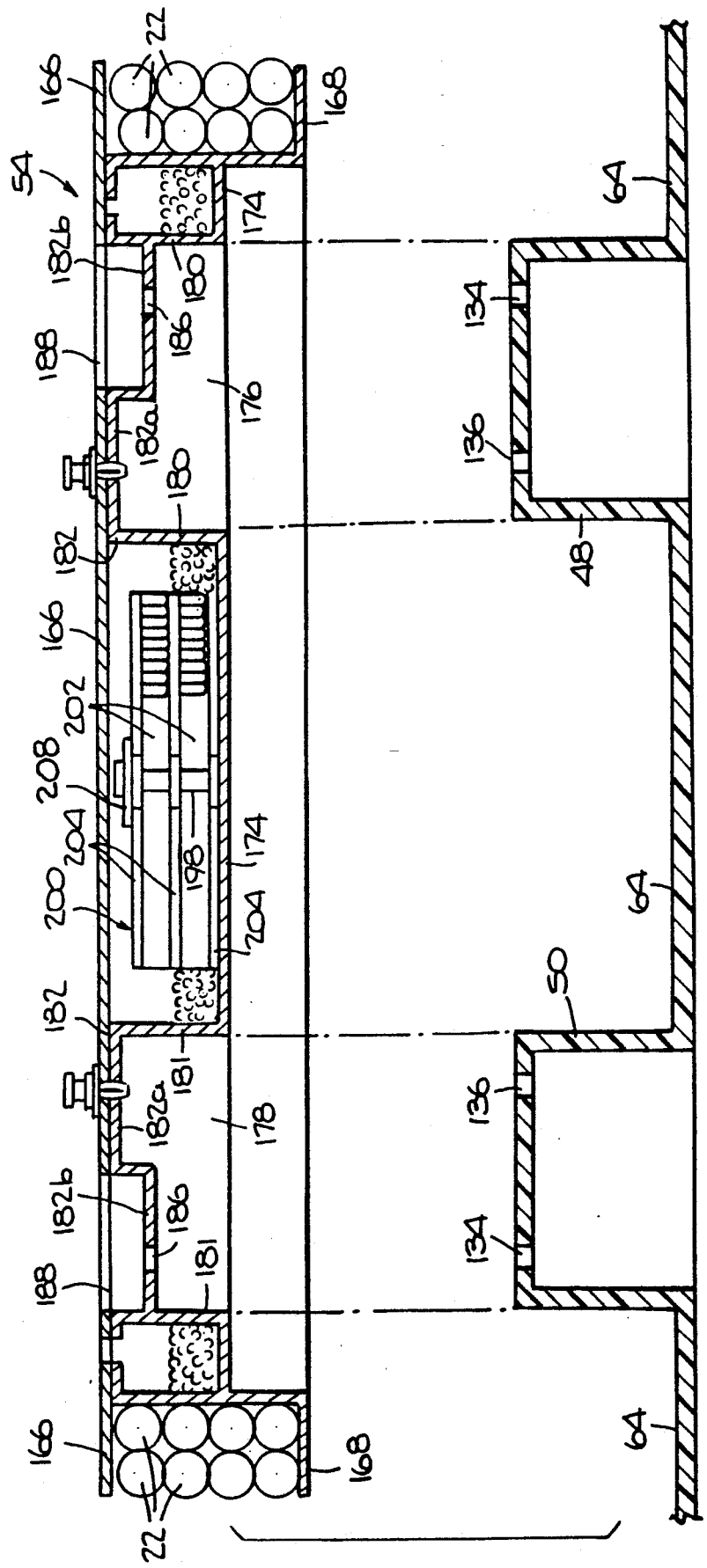

OPTICAL FIBER STORAGE AND DISTRIBUTION CABINET

BACKGROUND OF THE INVENTION

1. Field of the Invention

This invention relates to the storage, splicing and connecting of optical fibers and more particularly it concerns a novel optical fiber storage, splice and connector cabinet as well as novel splice holding arrangements which may be used in such cabinet.

2. Description of the Prior Art

U.S. patent application Ser. No. 07/468,352, filed Jan. 22, 1990 and assigned to the assignee of the present invention, discloses a novel optical fiber cable distribution frame and support. The frame and support shown in that application is well suited for large installations such as telephone company central offices. There is a need, however, for smaller arrangements which can be installed in areas remote from central offices, for example, at customer premises or in areas serviced by local area networks (LANS). Several different types of optical fiber cable and splice cabinets are currently available. These include, for example, the Northern Telecom QMY Fiber Interface Panel sold by Northern Telecom Inc. of Morton Grove, Ill., the BEFO and MDFO Series Fiber Optic Distribution Enclosures and the OP-FO-BD7 Fiber Optic Splice Cabinet sold by Reliable Electric/Utility Products of Franklin Park, Illinois and the Bejed Universal Customer Premise Fiber Optic Distribution Unit sold by Bejed of Portland, Oreg.

In spite of the large number of optical fiber cabinet designs which are on the market, there is still a need for a cabinet design which is sturdy, which holds optical fiber cable in a secure manner free from sharp bends (which could destroy its light transmitting capability), and which allows easy conversion from cable storage only to cable storage and cable splice holding, and which accommodates entry of optical fiber cables from different directions.

SUMMARY OF THE INVENTION

The present invention achieves the foregoing features in a novel optical fiber cabinet design and in a novel splice tray and splice holder design.

According to one aspect of the invention there is provided a novel optical fiber cable storage and distribution cabinet which comprises a base portion and a cover hinged to the base portion. The base portion is formed of molded plastic material and comprises a flat bottom wall with a pair of spaced apart U-shaped formations and a flange along one edge of the bottom wall and integrally molded therewith. The U-shaped formations project upwardly from the bottom wall; and each U-shaped formation comprises two parallel upwardly projecting legs connected to each other at their upper ends by a curved portion. The space between the legs of each U-shaped formation opens below the bottom wall and the curved portions of the U-shaped formations extend around a common axis located above and parallel with the edge of the bottom wall. The flange extends parallel to the bottom wall and is located close to and under the common axis and the bottom wall is open under the flange. Thus the bottom wall, the U-shaped formations and the flange can be molded in one operation without need for side pulls in the mold. The cover has a hinge pin along one edge, and the hinge pin extends through at least one of the U-shaped formations along the axis of its curved portion and above the adjacent flange for hingeably securing the cover to the base portion.

According to another aspect of the present invention there is provided a novel optical fiber cable storage and distribution cabinet which comprises a box-like housing and an optical fiber splice tray that can be mounted in and removed from the cabinet. The cabinet has a flat bottom wall, edge walls extending up from the edges of the bottom wall and a cover extending between the upper edges of the edge walls and removable therefrom. The edge walls are formed with an opening to allow optical fiber cables to enter into and exit from the cabinet. A pair of spool-like formations extend up from the bottom wall for supporting optical fibers and optical fiber cables wound thereon. The optical fiber splice tray comprises a generally flat bottom wall formed with a pair of openings which can fit around the spool-like formations, side walls which extend up from the edges of the openings in the bottom wall, and top walls which extend across the upper edges of the side walls. The splice tray can thus fit over the spool-like formations with the top walls resting on the upper surfaces of the spool-like formations. Fasteners are provided for attaching the top walls of the splice tray to the upper surfaces of the spool-like formations.

According to a further aspect of the invention there is provided a novel reversible splice tray for optical fiber cables. This novel splice tray comprises a generally flat bottom wall, a pair of cylindrical walls extending up from the bottom wall and a circumferential wall extending around the periphery of the bottom wall and surrounding the cylindrical walls. The circumferential wall is formed with a pair of spaced apart openings on each side thereof between the cylindrical walls; and the region of the circumferential wall between the openings of each pair is curved so that the ends of such region extend in toward the cylindrical walls. Means are provided for supporting an optical fiber splice holder between the cylindrical walls and means are also provided to support optical fiber cable clamps inside the circumferential wall adjacent the openings This arrangement permits optical fibers and optical fiber cables to be wound on the tray in either direction.

According to a still further aspect of the invention there is provided a novel reversible splice holder assembly which comprises a generally flat plate, on the opposite sides of which an optical fiber splice holder may be held to extend along a given axis on the plate, and fastener means extending from opposite edges of the plate. The fastener means are attachable to a support from either side of the plate. Also, the fastener means are located along a line that forms an acute angle with the given axis, whereby the given axis is shifted according to which side of the plate is attached to the support. A splice holder is attached to the upper side of the plate. Thus, depending on which side of the plate is fastened to the support, the plate axis, and the splice holder is made to extend in a different direction.

BRIEF DESCRIPTION OF THE DRAWINGS

FIG. 1 is a front elevational view of upper and lower optical fiber cable storage and distribution cabinets according to one embodiment of the present invention and showing a customer access door of the lower cabinet opened to reveal the customer side of an optical fiber cable connector arrangement in the cabinet;

FIG. 2 is a front elevational view of the lower cabinet of FIG. 1 and showing a company access door opened to reveal a spool type optical fiber cable storage arrangement;

FIG. 3 is a view similar to FIG. 2 and showing an optical fiber cable storage and splice tray mounted over the spool type storage arrangement;

FIG. 4 is a view similar to FIG. 3 but showing the optical fiber cable storage and splice tray removed from the cabinet;

FIG. 5 is a perspective view of one of the cabinets of FIG. 1 in fully closed condition;

FIG. 6 is a view similar to FIG. 5 but showing the cabinet in fully opened condition;

FIG. 7 is a view similar to FIG. 6 but showing the parts of the cabinet in exploded condition.

FIG. 10 is an enlarged section view taken along line 10—10 of FIG. 4 and showing the construction of the optical fiber cable storage and splice tray;

FIG. 12 is a view similar to FIG. 10 but showing the optical fiber cable storage and splice tray separated from the cabinet; and FIG. 13 is a view similar to FIG. 10 but showing a splice tray cover and a splice holder separated from the optical fiber cable storage and splice tray.

DETAILED DESCRIPTION OF THE PREFERRED EMBODIMENTS

Figure 8:
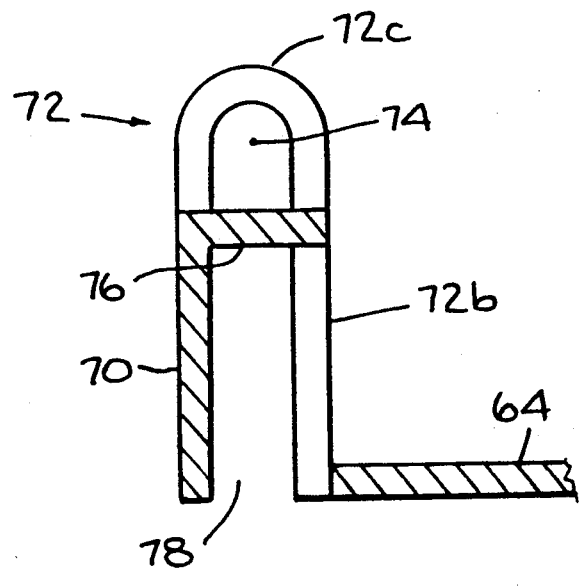
FIG. 8 is an enlarged section view taken along line 8—8 of FIG. 7.

FIG. 1 shows a vertical wall 20, which may be a wall in a customer's premises which receives communications along optical fiber cables from a remote location (not shown), such as a communications supply company. The communications supply company may be any company which supplies large volumes of electronically or optically encoded information, such as a telephone company, a computerized data supply company or a television company. Groups of optical fiber cables 22 and 24 enter the premises from either above or below the wall 20 and extend along the wall to optical fiber cable storage and distribution cabinets 26 and 28. There, selected cables are separated from the others and are arranged to be connected via optical fiber connectors to local equipment. As will be seen herein, these selected cables have extra lengths which are stored in the cabinets. In addition, cable splice trays may be provided in the cabinets for splicing the cables to pigtails which extend to connectors in the cabinets.

The cabinets 26 and 28 each have a service cover 30 and a customer access cover 32 with associated locks 34 and 36 which allow access to different compartments within the cabinets by the communications supply company and by the customer, respectively.

As shown in FIG. 1, the customer access cover 32 of the lower cabinet 28 is open to expose a customer access compartment 38 and allow access by the customer to one side of optical fiber connectors 40. The connectors 40 are of well known construction and permit the customer to selectively connect on-premises optical fiber cables 42 to individual cables from the groups 22 and 24.

FIG. 2 shows the cabinet 28 with both the customer access cover 32 and the service cover 30 opened to expose both the customer access compartment 38 and a service compartment 44. The service compartment 42 in the arrangement of FIG. 2 contains a cable clamp 46 for holding the group 22 of optical fiber cables which are to be utilized in the cabinet. In addition, the service compartment 44 contains a pair of optical fiber storage spools 48 and 50 for storing excess lengths of the cables in the group 22. In the arrangement shown, only the spool 48 is needed to accommodate the optical fibers being used; however, if additional fibers are brought into the cabinet 28, the other spool 50 can be used.

Upon leaving the storage spool 48, the individual optical fibers of the group 22 are separated and are directed to the service side of corresponding one of the connectors 40.

FIGS. 3 and 4 show an alternate arrangement in which a splice tray 54 is fitted into the service compartment 44. The splice tray 54 serves both to store extra lengths of the optical fiber cables 22 as well as a splice arrangement (described in detail hereinafter) which connects the cables 22 to pigtail cables 56. As shown, the pigtail cables 56 extend from the splice tray 54 to the service side of the connectors 40. As shown in FIG. 4, the splice tray 54 is mounted on the storage spools 48 and 50 and can be removed therefrom so that splicing work may be carried out on the tray at a location remote from the cabinet 28 such as on a table or workbench. To permit removal of the splice tray 54 to a remote location without disconnecting the optical fiber cables 22 or the pigtail cables 56, extra lengths of these cables are wound around the outside of the tray when it is positioned in the cabinet 28 as shown in FIG. 3. When the tray is removed, as shown in FIG. 4, the tray is turned to unwind the cables 22 and 56 therefrom.

The overall construction of the cabinet 28 is shown in FIGS. 5-9. As can be seen in FIG. 5, the cabinet is of generally flat rectangular configuration and is provided with access openings 58 near each of its corners to allow entry and exit of the various optical fiber cables 22, 24 and 42. A service cover hinge 60 is provided along a rear upper edge of the cabinet to support the service cover 30. Also, a customer access cover hinge 62 is provided along a front lower edge to support the customer access cover 32.

It will be noted that the service cover 30 is flat and extends across the upper part of the cabinet whereas the customer access cover 32 is bent to form a front wall portion 32a and a top wall portion 32b. This permits the customer to have good access to the connectors 40 for making and changing connections when the cover 32 is open. Also, when the cover 32 is open, its top wall portion 32b extends upwardly in front of the connectors 40 to prevent persons from looking directly at the ends of the connectors 40. This is a safety measure to protect against damage to the eyes from the intense light that may project from the connectors 40 when the on-premises optical fiber cables 42 are disconnected from the connectors. As shown in FIGS. 6 and 7, the cabinet 28 is formed of a flat bottom wall 64 upper and lower side walls 66 and 68 and a back wall 70 all integrally molded as one piece. Preferably, the bottom, side and back walls are molded of structural foam polycarbonate. This material has a solid foam core with a continuous plastic skin on opposite sides thereof. An example of such material is Lexan FL900 structural foam sold by the General Electric Company or Mobay SF800 structural foam sold by Mobay Chemical Corp. This structural foam material provides great strength and rigidity and high resistance to wear and deterioration. The covers 30 and 32 are made of heavy gauge sheet metal, aluminum or cold rolled steel, which also provides strength and rigidity as well as resistance to tampering.

The upper and lower side walls 66 and 68 terminate short of the front and rear edges of the bottom wall 64 and thereby form the access openings 58 for the cables 22, 24 and 42.

As shown in FIGS. 7 and 8, rear U-shaped formations 72 are molded integrally with the bottom and back walls 64 and 70 along the rear edge of the bottom wall 64 and at the opposite ends of the back wall 70. These U-shaped formations each comprise a pair of legs 72a and 72b which project upwardly from the bottom wall and which are connected to each other at their upper ends by a curved portion 72c. The space between the legs 72a and below the bottom wall 64. The curved portions 72c of the rear U-shaped formations 72 extend around a common rear hinge axis 74 located above and parallel with the rear edge of the bottom wall 64; and, more specifically in the case of the present embodiment, along the upper edge of the back wall 70. Rear hinge flanges 76 are integrally molded with the bottom wall 64 near the rear U-shaped formations 72. As can be seen in FIG. 7, these flanges extend inwardly from the upper edges of the back wall 70, parallel to the bottom wall 64 and close to and under the rear hinge axis 74. The bottom wall 64 is open under the rear hinge flanges 76 as indicated at 78. It will be appreciated that because of the shape and arrangement of the rear U-shaped formations 72, the rear hinge flanges 76 and the openings 78 in the bottom wall 64, the U-shaped formations and the flanges can be molded integrally with the bottom, side and back walls 64, 66, 68 and 70 in one operation without need for side pulling molds.

The service cover 30 is formed with a cylindrical bend 82 along one edge thereof; and plastic bushings 84 are fitted into each end of the cylindrical bend as shown in FIG. 7. The cylindrical bend 82 is dimensioned to fit between the rear hinge U-shaped formations 72 and over the rear hinge flanges 76. Rear hinge pins 86 extend in through the U-shaped formations along the common rear hinge axis 74 and into the bushings 84. Lock washers 88 are positioned between the outer ends of the bushings 84 and the inner sides of the U-shaped formations 72 to hold the pins 74 from slipping back out from the bushings and U-shaped formations.

It will be appreciated that the U-shaped formations 72 in combination with the flanges 76 provide firm support for the pins 86 and the bushings 84 so that the service cover 30 is hingeably secured to the remainder of the cabinet 28.

Figure 9:
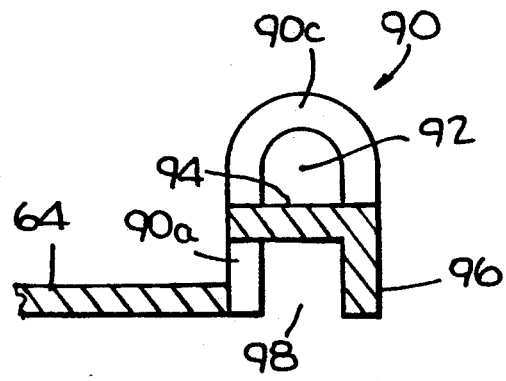
FIG. 9 is an enlarged section view taken along line 9—9 of FIG. 7.

As shown in FIGS. 7 and 9, a pair of front U-shaped formations 90 are molded integrally with the bottom wall 64 at opposite ends of the front edge thereof. These U-shaped formations are shaped in generally the same manner as the rear U-shaped formations 72; and they each comprise a pair of legs 90a and 90b which project upwardly from the bottom wall 64 and which are connected to each other at their upper ends by a curved portion 90c. The space between the legs 90a and 90b of each of the front U-shaped formations 90 also opens below the bottom wall 64. The curved portions 90c of the front U-shaped formations 90 extend around a common front hinge axis 92 located above and parallel with the rear edge of the bottom wall 64. Front hinge flanges 94 are integrally molded with the bottom wall 64 near the rear U-shaped formations 72. As can be seen in FIG. 7, these flanges extend from a front ridge 96 inwardly and parallel to the bottom wall 64 and close to and under the front hinge axis 92. The bottom wall 64 is open under the front hinge flanges 94 as indicated at 98. As indicated above in connection with the rear hinge arrangement, the shape and arrangement of the front U-shaped formations 90, the front hinge flanges 94 and the openings 98 in the bottom wall 64, the U-shaped formations and the flanges can be molded integrally with the bottom, side and back walls 64, 66, 68 and 70 in one operation without need for side pulling molds.

The customer access cover 32 is formed with a cylindrical bend 100 along the edge of the front wall portion 32a; and plastic bushings 102 are fitted into each end of the cylindrical bend as shown in FIG. 7. The cylindrical bend 100 is dimensioned to fit between the front hinge U-shaped formations 90 and over the front hinge flanges 94. Front hinge pins 104 extend in through the U-shaped formations 90 along the common front hinge axis 92 and into the bushings 102. Lock washers 106 are positioned between the outer ends of the bushings 102 and the inner sides of the U-shaped formations 90 to hold the pins 104 from slipping back out from the bushings and U-shaped formations. It will be appreciated that as in the case of the rear U-shaped formations 72, the front U-shaped formations 90 in combination with the flanges 94 provide firm support for the pins 104 and the bushings 102 so that the customer access cover 3 is hingeably secured to the remainder of the cabinet 28.

The customer access compartment 38 and the service compartment 44 are separated by a connector support wall 108 which comprises a pair of connector bulkheads 110 arranged between a central support 112 and the upper and lower side walls 66 and 68. The bulkheads slide into vertical slots 114 formed on each side of the central support and in ridges 116 on the upper and lower sidewalls 66 and 68. The central support 112 is molded integral with the bottom wall 64. The connector bulkheads are formed with bulkhead flanges 118 which project from their lower edge along the bottom wall; and single push type fastener elements 120 of well known construction extend through holes 122 in the flanges and holes 124 in the bottom wall 64 to hold the bulkheads in place. The bulkheads are formed with connector openings 126 for mounting standard optical fiber connectors, for example, of the biconic type. Depending upon the customer's needs, bulkheads having openings of different shape or size may easily be substituted to accommodate different types of optical connectors.

The top wall portion 32b of the customer access cover 32 in the closed position shown in FIG. 5, extends back from the front of the cabinet 28 to the connector support wall 108 (FIGS. 6 and 7). The central support 112 is formed with an upper flange 128; and a metal clip 130 fits over the flange to accommodate a locking pin 132 of the customer access cover lock 36 when the customer access cover 32 is closed.

The optical fiber storage spools 48 and 50 are molded into the bottom wall 64 in the service compartment 44. The spools should have a minimum diameter such that fiber optic cables wound thereon will not be bent to less than a critical radius beyond which the light transmitting properties of the cable will be impaired. In the preferred embodiment the spool diameter is about three inches (7.62 cm). The spool height must be less than that of the side and back walls 66, 68 and 70, so that the service cover may fit over the spools. However, in the preferred embodiment, the spools 48 and 50 are of even less height to accommodate the mounting of the splice tray 54 as will be explained hereinafter.

The spools 48 and 50 each have a pair of openings 134 and 136 formed in their upper surface. In addition, diametrically opposed cutouts 138 are formed along the upper corners of the spools. These cutouts may be used to accommodate a strap or a flange (not shown) for holding in place optical fibers which are wound around the spools. Removable flange plates 140 are provided for each of the spools 48 and 50. These flange plates are formed of plastic sheet; and they have a central portion 142 which fits over the top of the spools and projecting fingers 144 which extend beyond the upper edges of the spools to hold in place optical fiber cable or optical fibers wound on the spools. The central portion 142 of each of the flange plates 140 is formed with a pair of holes 146 and 148 which are aligned with the holes 134 and 136 on the upper surfaces of the spools 48 and 50; and fastener elements 150 and 152, similar to the fastener elements 120, pass through the holes 146 and 134 and through the holes 148 and 136 respectively to hold the flange plates in place on top of the spools. The fastener elements may be withdrawn from the holes to allow removal of the flange plates in order to mount the splice tray 54 as will be explained.

Lower cable clamp halves 154 are molded into the bottom wall 64 near the rear access openings 58. Cooperating upper cable clamp halves 156 are also provided; and the upper and lower halves are held together by bolts 158 and nuts 160 to hold optical fiber cables in place as they enter the cabinet. Corresponding cable clamping arrangements (not shown) may be provided to hold the on-premises optical fiber cables 42 which pass through the forward access openings 58.

The cabinets 26 and 28 (FIG. 1) may be fastened to the vertical wall 23 in any known manner, for example by means of mounting bolts 162 and nuts 164 as shown in FIG. 7.

The splice tray 54, as shown in FIG. 7 is of generally oblong configuration and extends over both the storage spools 48 and 50. The splice tray comprises upper and lower flange-like walls 166 and 168 which are separated by a vertical circumferential wall 170. The upper wall 166 is removable from the remainder of the splice tray and is held thereto by means of fastener elements 172.

The detailed construction of the splice tray 54 is shown in FIGS. 10-13. As shown in FIGS. 10, 12 and 13, the splice tray 54 further includes a flat bottom wall 174 which extends within the circumferential wall 170 parallel to and intermediate the upper and lower flange-like walls 166 and 168. The flat wall 174 is formed with a pair of openings 176 and 178 which fit around and accommodate the storage spools 48 and 50. Cylindrical side walls 180 and 181 extend up from around the openings 176 and 178 to top walls 182. The top walls 182 each have a higher semicircular region 182a and a lower semicircular region 182b. When the tray 54 is fitted onto the spools 48 and 50, the spools pass through the openings 176 and 178 and the lower semicircular regions 182b of the top walls 182 of the tray 54 rest on the tops of the spools. Splice tray fasteners 184 pass through openings 186 in the lower semicircular regions 182b and through the openings 134 in the tops of the spools 48 and 50 to hold the splice tray onto the spools. These fasteners also may be of any well known construction which may be snapped into place by pressing downwardly and then removed by pulling upwardly.

In order to permit access for the fasteners 184 to the lower semicircular regions 182b, the upper splice tray wall 166 is formed with semicircular openings 188 above the lower semicircular regions 182b of the splice tray top walls 182. Also, as can be seen in FIG. 10 when the tops of the spools 48 and 50 come to rest against the lower semicircular regions 182b of the splice tray 54, there is a space 190 between the tops of the spools and the higher semicircular regions 182a of the splice tray. The space 190 accommodates the fastener elements 172 which hold the upper splice tray wall 166 to the splice tray. Thus the upper splice tray wall can be removed from the splice tray independently of whether the splice tray is mounted on the spools 48 and 50 or not.

Figure 11:
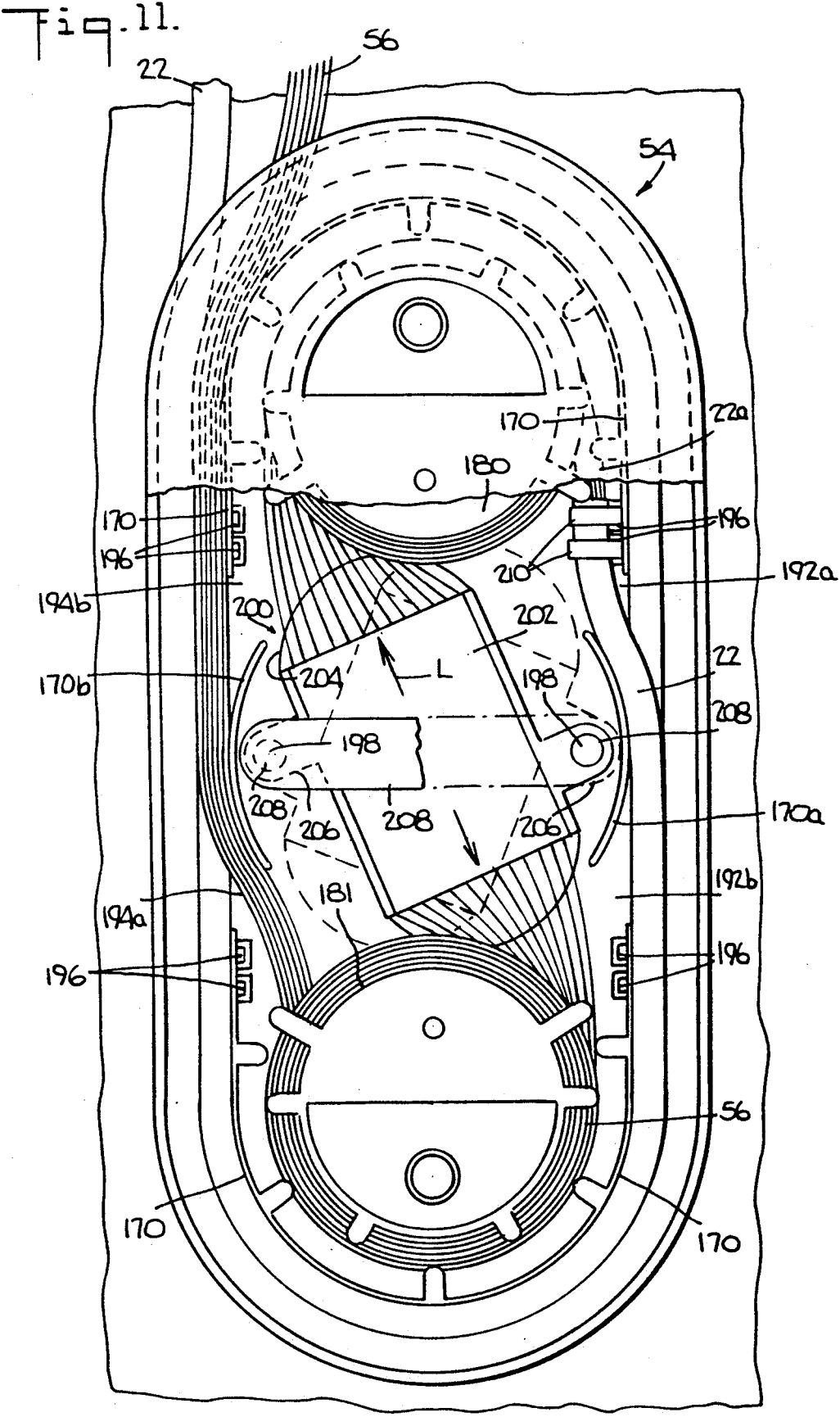
FIG. 11 is a plan view of the optical fiber cable storage and splice tray of FIG. 10.

Turning now to FIG. 11, it will be seen that the circumferential wall 170 of the splice tray 54 is formed with a first set of spaced apart openings 192a and 192b on one side of the tray and a second set of spaced apart openings 194a and 194b on the opposite side of the tray. Between the openings of each set is a curved portion 170a and 170b of the circumferential wall 170; and the ends of each curved portion extend inwardly toward the cylindrical side wall 180 or the cylindrical sidewall 181. Just inside the openings on the straight portion of the circumferential wall 170 there is provided a cable clamp anchor 196.

As can be seen in FIG. 11, a pair of splice holder support posts 198 extend up from the flat wall 174 of the splice tray inside of and midway along the curved portions 170a and 170b of the circumferential wall 170.

A splice tray assembly 200 is mounted on the support posts 198 between the side walls 180. The splice tray assembly 200 comprises splice holder blocks 202 sandwiched between block mounting plates 204. The splice holder blocks 202 are of conventional construction and comprises molded plastic blocks formed with parallel grooves along which individual optical fibers and splices are held. In general, about twelve such splices and associated fibers are provided on each block.

The mounting plates 204 are flat elements of sheet plastic on which the splice holder blocks are placed. The mounting plates 204 have an elongated oval shape which extends along a given longitudinal axis L. Mounting flanges 206 extend outwardly from each side edge of the plate. The mounting flanges 206 are offset relative to each other along the axis L so that a line between the flanges forms an acute angle with the axis L. The mounting flanges 206 are provided with holes 208 which fit over the support posts 198 as shown in FIG. 11. It will be seen that because of the offset of the flanges 206, the longitudinal axis L of the oval shaped mounting plate 204 extends along a diagonal between the cylindrical side walls 180 and 181. In addition, when the mounting plate is turned over and then mounted on the support posts 198 the longitudinal axis L of the plate will extend along a different diagonal as indicated in phantom outline in FIG. 11.

The splice holder blocks 202 are held on associated mounting plates 204 by means of adhesive such as double faced adhesive tape. The splice holder blocks are placed on the mounting plates so that the grooves in the block follow the given longitudinal axis L of the plate. Thus, by mounting the splice holder block 202 on one side or the other of the mounting plate 204, the direction of the block grooves can be set to follow one diagonal or the other.

An assembly of stacked splice holder blocks 202 and associated mounting plates 204 can be mounted on the support posts 198, as shown in FIGS. 10, 12 and 13. Also, to hold the assembly in place an elastic strap 208 is mounted over the posts 198.

It will be appreciated that the splice tray 54 is readily adaptable for clockwise or counter-clockwise winding of optical fiber cables, splices and pigtails. Thus, for example in the installation shown in FIGS. 3 an 4 the optical cable 22 enters from the top left and the splice tray 54 can be removed and unwound in a clockwise direction. However, if the cable 22 were to enter from the bottom left, the splice tray 54 should be unwound in a clockwise direction.

The splice tray 54 shown in FIGS. 11-13 is readily adaptable to winding and unwinding in either direction. As shown in FIG. 11, the cable 22 winds around the circumferential wall 170 in a counterclockwise direction and enters into the opening 192a. However, if the cable were to enter from the other direction, it could be wound around the wall 170 in a clockwise direction and enter into the opening 194a. Also, in the arrangement shown the cable 22 is held by a clamp 210 to the anchor 196 inside the opening 192a and individual buffered optical fibers 22a extend around the cylindrical sidewall 180. Depending on the length of the fibers, they may be wound one or more times around the sidewall. Eventually the buffered optical fibers enter into one end of an associated one of the splice holders 202 where they are spliced to associated pigtail cables 56. The pigtail cables 56 exit from the opposite end of the splice holder and pass around the other cylindrical sidewall 181. The pigtail cables 56 wind around the sidewall 181 one or more times, depending on their length, and then exit via the opening 194a to the outside of the circumferential wall 170. The pigtail cables 56 wind around the wall 170 about the same number of times as the incoming cable 22, so that the splice tray 54 can be unwound, as shown in FIG. 4, to a convenient location away form the cabinet 28.

By mounting the splice tray assembly 200 to extend along a diagonal between the cylindrical sidewalls 180 and 181, it is possible to have both the incoming cable 22 and the outgoing pigtail cables 56 wound in the same direction so that the tray 54 is easily removable from the cabinet 28 without requiring any disconnections. Also, by virtue of the construction of the splice holder mounting plates 204, it is possible to change the direction of the diagonal so that the cable and pigtails can be wound in the opposite direction.

We claim:

1. An optical fiber cable storage and distribution cabinet comprising a base portion of molded plastic material and formed with a flat bottom wall, a pair of spaced apart U-shaped formations integrally molded with and projecting upwardly from said bottom wall along one edge thereof, each U-shaped formation comprising two parallel upwardly projecting legs connected to each other at their upper ends by a curved portion, the space between the legs of each U-shaped formation opening below said bottom wall, said curved portions of said U-shaped formations extending around a common axis located above and parallel with said one edge of said bottom wall, a flange integrally molded with said bottom wall near said U-shaped formations, said flange extending parallel to said bottom wall and located close to and under said common axis, said bottom wall being open under said flange, whereby said bottom wall, said U-shaped formations and said flange can be molded in one operation without need for side pulls in the mold, and a cover having a hinge pin along one edge, said hinge pin extending through at least one of said U-shaped formations along the axis of its curved portion and above the adjacent flange for hingeably securing said cover to said base portion.

2. An optical fiber cable storage and distribution cabinet according to claim 1 wherein said U-shaped formations are located at opposite ends of a back wall extending up from said bottom wall.

3. An optical fiber cable storage and distribution cabinet according to claim 2 wherein said flange extends from said back wall.

4. An optical fiber cable storage and distribution cabinet according to claim 3 wherein the curved portion of said U-shaped formations extend above the upper edge of said back wall.

5. An optical fiber cable storage and distribution cabinet according to claim 4 wherein separate flanges extend from said back wall adjacent each of said U-shaped formations.

6. An optical fiber cable storage and distribution cabinet according to claim 1 wherein separate hinge pins extend through each of said U-shaped formations.

7. An optical fiber cable storage and distribution cabinet according to claim 1 wherein said cover is formed of sheet metal and is bent along one edge to a cylindrical formation which fits between said U-shaped formations.

8. An optical fiber cable storage and distribution cabinet according to claim 7 wherein bushings extend into said cylindrical formation and accomodate said hinge pins.

9. An optical fiber cable storage and distribution cabinet according to claim 8 wherein a lock washer is provided on said hinge pin between said bushing and said U-shaped formation.

10. An optical fiber cable storage and distribution cabinet according to claim 1 wherein said U-shaped formations are spaced apart along the front edge of said bottom wall and wherein said cover has a front wall portion which has a hinge pin extending along one edge and which is bent along an opposite edge to form a top wall, said hinge pin extending through at least one of said U-shaped formations.

11. An optical fiber cable storage and distribution cabinet comprising a box-like housing having a flat bottom wall, edge walls extending up from the edges of the bottom wall, a cover extending between the upper edges of the edge walls and removable therefrom, said edge walls being formed with an opening to allow optical fiber cables to enter into and exit from said cabinet, a pair of spool-like formations extending up from the bottom wall for supporting optical fibers and optical fiber cables wound thereon, an optical fiber splice tray comprising a generally flat bottom wall formed with a pair of openings which can fit around said spool-like formations, side walls extending up from the edges of said openings and top walls extending across the upper edges of said side walls whereby said splice tray can fit over said spools with said top walls resting on the upper surfaces of said spools, and fasteners for attaching said top walls to the upper surfaces of said spools.

12. An optical fiber cable storage and distribution cabinet according to claim 11 further including flange plates which are dimensioned to extend over the edges of the top walls of said formations.

13. An optical fiber cable storage and distribution cabinet according to claim 12 wherein said flange plates have holes therein to accomodate fasteners for attaching said flange plates to the top walls of said spool-like formations.

14. An optical fiber cable storage and distribution cabinet according to claim 11 wherein said splice tray has a circumferential wall extending around said flat bottom wall.

15. An optical fiber cable storage and distribution cabinet according to claim 14 wherein said splice tray has an upper wall which extends beyond said circumferential wall to form an upper flange.

16. An optical fiber cable storage and distribution cabinet according to claim 15 wherein said upper wall is removeable from said splice tray.

17. An optical fiber cable storage and distribution cabinet according to claim 16 wherein said upper wall has holes therein in alignment with holes in said top walls to accomodate fasteners for attaching said upper wall to said splice tray.

18. An optical fiber cable storage and distribution cabinet according to claim 17 wherein said upper wall is formed with openings surrounding the fasteners which attach said top walls to the upper surfaces of said spool-like formations.

19. An optical fiber cable storage and distribution cabinet according to claim 18 wherein said top walls each have a higher portion and a lower portion, the lower portion being in alignment with the fasteners which attach said top walls to the upper surfaces of said spool-like formations and the higher portion being in alignment with the fasteners for attaching the upper wall to said top wall.

20. An optical fiber cable storage and distribution cabinet according to claim 11 wherein a splice holder attachment element is mounted on said bottom wall between said side walls.

21. A reversible splice tray for optical fiber cables, said splice tray comprising a generally flat bottom wall a pair of cylindrical walls extending up from said bottom wall, a circumferential wall extending around the periphery of said bottom wall and surrounding said cylindrical walls, said circumferential wall being formed with a pair of spaced apart openings on each side thereof between said cylindrical walls, the region of said circumferential wall between the openings of each pair being curved so that the ends of such region extend in toward said cylindrical walls, means for supporting an optical fiber splice holder between said cylindrical walls and means to support optical fiber cable clamps inside said circumferential wall adjacent said openings.

22. A reversible splice tray for optical fiber cables according to claim 21 wherein means to support splice holders are arranged between said regions of said circumferential wall.

23. A reversible splice tray for optical fiber cables according to claim 22 wherein said means to support said splice holders is arranged to hold such splice holders to extend in a diagonal direction between said cylindrical walls.

24. A reversible splice tray for optical fiber cables according to claim 23 wherein said means to support said splice holders is constructed to permit change in the diagonal direction of said splice holders.

25. A reversible splice tray for optical fiber cables according to claim 24 wherein said means to mount splice holders comprise a pair of support posts extending up from said bottom wall, inside of and near the center of said regions of said circumferential wall.

26. A reversible splice tray for optical fiber cables according to claim 21 wherein upper and lower walls extend outwardly from the upper and lower edges, respectively, of said circumferential wall.

27. A reversible splice holder assembly comprising a generally flat plate on the opposite sides of which an optical fiber splice holder may be held to extend along a given axis on said plate and fastener means extending from opposite side edges of said plate, said fastener means being attachable to a support from either side of said plate, said fastener means being located along a line that forms an acute angle with said given axis, whereby said given axis is shifted according to which side of said plate is attached to said support, and a splice holder attached to one side of said plate.

28. A reversible splice holder assembly according to claim 27 wherein said fastener means comprises flanges extending out from opposite edges of said plate.

29. A reversible splice holder assembly according to claim 28 wherein said flanges are offset relative to each other along said edges.

30. A reversible splice holder assembly according to claim 28 wherein said flanges have holes therein for mounting on posts.

31. A reversible splice holder assembly according to claim 27 wherein a plurality of plates are arranged in stacked array, each having a splice holder attached to one side thereof.

* * * * *

UNITED STATES PATENT AND TRADEMARK OFFICE
CERTIFICATE OF CORRECTION

PATENT NO. : 5,119,459

DATED : June 2, 1992

INVENTOR(S) : CARL MEYERHOEFER ET AL.

It is certified that error appears in the above-identified patent and that said Letters Patent is hereby corrected as shown below:

COLUMN 2

Line 42, "openings This" should read --openings. This--.

COLUMN 3

Line 63, "well known" should read --well-known--.

COLUMN 4

Line 58, "wall 64 upper" should read --wall 64, upper--.

COLUMN 5

Line 16, "and below" should read --and 72b of each of the rear U-shaped formations 72 opens below--.

COLUMN 6

Line 27, "cover 3" should read --cover 32--.
Line 40, "well" should read --well- --.

COLUMN 7

Line 66, "well known" should read --well-known--.

COLUMN 8

Line 24, "sidewall" should read --side wall--.
Line 37, "comprises" should read --comprise--.

UNITED STATES PATENT AND TRADEMARK OFFICE
CERTIFICATE OF CORRECTION

PATENT NO. : 5,119,459

DATED : June 2, 1992

INVENTOR(S) : CARL MEYERHOEFER ET AL.

It is certified that error appears in the above-identified patent and that said Letters Patent is hereby corrected as shown below:

COLUMN 9

Line 7, "counter-clockwise" should read --counterclockwise--.
Line 25, "sidewall" should read --side wall--.
Line 27, "sidewall." should read --side wall.--.
Line 32, "sidewall" should read --side wall--.
Line 33, "sidewall" should read --side wall--.
Line 39, "form" should read --from--.
Line 42, "sidewalls" should read --side walls--.

COLUMN 10

Line 17, "tion" should read --tions--.
Line 33, "accomodate" should read --accommodate--.

UNITED STATES PATENT AND TRADEMARK OFFICE
CERTIFICATE OF CORRECTION

PATENT NO. : 5,119,459
DATED : June 2, 1992
INVENTOR(S) : CARL MEYERHOEFER ET AL.

It is certified that error appears in the above-identified patent and that said Letters Patent is hereby corrected as shown below:

COLUMN 11

Line 3, "accomodate" should read --accommodate--.
    Line 20, "accomodate" should read --accommodate--.
    Line 40, "wall" should read --wall,--.

Signed and Sealed this

Sixteenth Day of November, 1993

Attest:

BRUCE LEHMAN

Attesting Officer

Commissioner of Patents and Trademarks